(12) United States Patent
Fukuda et al.

(10) Patent No.: US 7,327,091 B2
(45) Date of Patent: Feb. 5, 2008

(54) LIGHT-EMITTING ELEMENT DRIVING APPARATUS

(75) Inventors: Kazuo Fukuda, Gunma-Ken (JP); Tsutomu Fujino, Gunma-Ken (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 218 days.

(21) Appl. No.: 11/319,925

(22) Filed: Dec. 28, 2005

(65) Prior Publication Data
US 2006/0139267 A1 Jun. 29, 2006

(30) Foreign Application Priority Data
Dec. 28, 2004 (JP) ............................. 2004-381258

(51) Int. Cl.
G09G 3/12 (2006.01)
(52) U.S. Cl. ............................... 315/169.3; 315/169.1; 345/82; 345/77
(58) Field of Classification Search .. 315/169.1–169.4; 345/76–84, 87–90
See application file for complete search history.

(56) References Cited

U.S. PATENT DOCUMENTS

| | | | | |
|---|---|---|---|---|
| 6,958,742 B2* | 10/2005 | Date et al. | ..................... | 345/90 |
| 6,995,516 B2* | 2/2006 | Aoki et al. | ............... | 315/169.3 |
| 7,109,953 B2* | 9/2006 | Abe et al. | ..................... | 345/212 |
| 2003/0016198 A1* | 1/2003 | Nagai et al. | ................... | 345/83 |
| 2003/0151374 A1* | 8/2003 | Maede et al. | ............ | 315/169.3 |
| 2003/0205973 A1* | 11/2003 | Park et al. | ............... | 315/169.1 |

* cited by examiner

*Primary Examiner*—Douglas W. Owens
*Assistant Examiner*—Ephrem Alemu
(74) *Attorney, Agent, or Firm*—Osha Liang LLP

(57) ABSTRACT

A light-emitting element driving apparatus includes a constant-current circuit and a control circuit. The constant-current circuit includes a plurality of constant-current sources that are connected in parallel with each other and are respectively connected in series to a light-emitting element to supply current to the light-emitting element. The constant-current sources arrange 1st to Nth (N is an integer not smaller than 2) constant-current blocks each including 1st to Mth (M is an integer not smaller than 2) constant-current sources. A current ratio among the 1st to Mth constant-current sources is substantially identical in all of the constant-current blocks. The control circuit selectively brings the 1st to Mth constant-current sources into a valid state based on light-quantity correction data representing valid/invalid states of the 1st to Mth constant-current sources commonly for all of the constant-current blocks, and selectively turns on the 1st to Nth constant-current blocks based on gradation data representing on/off states of the 1st to Nth constant-current blocks. A constant-current source, belonging to a turned-on constant-current block and being in a valid state, supplies current to the light-emitting element.

10 Claims, 8 Drawing Sheets

| GRADATION STEP | GRADATION DATA | | | | GRADATION OUTPUT CURRENT VALUES IN RELATION TO VARIOUS LIGHT-QUANTITY CORRECTION DATA (mA) | | | | | | | | | | | | | | |
|---|---|---|---|---|---|---|---|---|---|---|---|---|---|---|---|---|---|---|---|
| | | | | | 0000 | 0001 | 0010 | 0011 | 0100 | 0101 | 0110 | 0111 | 1000 | 1001 | 1010 | 1011 | 1100 | 1101 | 1110 | 1111 |
| 1 | 0 | 0 | 0 | 0 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| 2 | 0 | 0 | 0 | 1 | 1.250 | 1.375 | 1.500 | 1.625 | 1.750 | 1.875 | 2.000 | 2.125 | 2.250 | 2.375 | 2.500 | 2.625 | 2.750 | 2.875 | 3.000 | 3.125 |
| 3 | 0 | 0 | 1 | 0 | 2.500 | 2.750 | 3.000 | 3.250 | 3.500 | 3.750 | 4.000 | 4.250 | 4.500 | 4.750 | 5.000 | 5.250 | 5.500 | 5.750 | 6.000 | 6.250 |
| 4 | 0 | 0 | 1 | 1 | 3.750 | 4.125 | 4.500 | 4.875 | 5.250 | 5.625 | 6.000 | 6.375 | 6.750 | 7.125 | 7.500 | 7.875 | 8.250 | 8.625 | 9.000 | 9.375 |
| 5 | 0 | 1 | 0 | 0 | 5.000 | 5.500 | 6.000 | 6.500 | 7.000 | 7.500 | 8.000 | 8.500 | 9.000 | 9.500 | 10.000 | 10.500 | 11.000 | 11.500 | 12.000 | 12.500 |
| 6 | 0 | 1 | 0 | 1 | 6.250 | 6.875 | 7.500 | 8.125 | 8.750 | 9.375 | 10.000 | 10.625 | 11.250 | 11.875 | 12.500 | 13.125 | 13.750 | 14.375 | 15.000 | 15.625 |
| 7 | 0 | 1 | 1 | 0 | 7.500 | 8.250 | 9.000 | 9.750 | 10.500 | 11.250 | 12.000 | 12.750 | 13.500 | 14.250 | 15.000 | 15.750 | 16.500 | 17.250 | 18.000 | 18.750 |
| 8 | 0 | 1 | 1 | 1 | 8.750 | 9.625 | 10.500 | 11.375 | 12.250 | 13.125 | 14.000 | 14.875 | 15.750 | 16.625 | 17.500 | 18.375 | 19.250 | 20.125 | 21.000 | 21.875 |
| 9 | 1 | 0 | 0 | 0 | 10.000 | 11.000 | 12.000 | 13.000 | 14.000 | 15.000 | 16.000 | 17.000 | 18.000 | 19.000 | 20.000 | 21.000 | 22.000 | 23.000 | 24.000 | 25.000 |
| 10 | 1 | 0 | 0 | 1 | 11.250 | 12.375 | 13.500 | 14.625 | 15.750 | 16.875 | 18.000 | 19.125 | 20.250 | 21.375 | 22.500 | 23.625 | 24.750 | 25.875 | 27.000 | 28.125 |
| 11 | 1 | 0 | 1 | 0 | 12.500 | 13.750 | 15.000 | 16.250 | 17.500 | 18.750 | 20.000 | 21.250 | 22.500 | 23.750 | 25.000 | 26.250 | 27.500 | 28.750 | 30.000 | 31.250 |
| 12 | 1 | 0 | 1 | 1 | 13.750 | 15.125 | 16.500 | 17.875 | 19.250 | 20.625 | 22.000 | 23.375 | 24.750 | 26.125 | 27.500 | 28.875 | 30.250 | 31.625 | 33.000 | 34.375 |
| 13 | 1 | 1 | 0 | 0 | 15.000 | 16.500 | 18.000 | 19.500 | 21.000 | 22.500 | 24.000 | 25.500 | 27.000 | 28.500 | 30.000 | 31.500 | 33.000 | 34.500 | 36.000 | 37.500 |
| 14 | 1 | 1 | 0 | 1 | 16.250 | 17.875 | 19.500 | 21.125 | 22.750 | 24.375 | 26.000 | 27.625 | 29.250 | 30.875 | 32.500 | 34.125 | 35.750 | 37.375 | 39.000 | 40.625 |
| 15 | 1 | 1 | 1 | 0 | 17.500 | 19.250 | 21.000 | 22.750 | 24.500 | 26.250 | 28.000 | 29.750 | 31.500 | 33.250 | 35.000 | 36.750 | 38.500 | 40.250 | 42.000 | 43.750 |
| 16 | 1 | 1 | 1 | 1 | 18.750 | 20.625 | 22.500 | 24.375 | 26.250 | 28.125 | 30.000 | 31.875 | 33.750 | 35.625 | 37.500 | 39.375 | 41.250 | 43.125 | 45.000 | 46.875 |

Fig. 4

LIGHT-EMITTING ELEMENT DRIVING APPARATUS

CROSS-REFERENCE TO RELATED APPLICATIONS

The entire disclosure of Japanese Patent Application No. 2004-381258 including the specification, claims, drawings and abstract is incorporated herein by reference.

BACKGROUND OF THE INVENTION

1. Field of the Invention

The present invention relates to a light-emitting element driving apparatus which drives light-emitting elements.

2. Description of the Related Art

Pulse width modulation (PWM) method is generally known as a preferable method for realizing a desired gradation by adjusting the amount of light emitted by a light-emitting element, such as, for example, a light-emitting diode (LED). Especially, when a light quantity correction for the LED is performed based on an adjustment of driving current value prior to gradation control of an LED, as changing the driving current value for the gradation control is difficult, the PWM method is preferably used for the gradation control.

However, according to the PWM method, the pulse width must be finely controlled, and the on/off control of a signal generates switching noise which is a significant source of problematic electromagnetic interference (EMI).

Furthermore, with the PWM method, problems will arise in a system which employs a combination of a plurality of LEDs of different luminescent colors to obtain a desired color. As the gradation is generally realized by changing the pulse width, that is, the gradation is realized by adjusting the ON time during which the current flows, substantial mixing of colors is realized only in a limited period of time, as shown in FIG. 8, and reproducibility of colors is not good.

SUMMARY OF THE INVENTION

The present invention provides a light-emitting element driving apparatus that drives a light-emitting element, including a constant-current circuit and a control circuit. The constant-current circuit includes a plurality of constant-current sources that are connected in parallel with each other and are respectively connected in series to a light-emitting element to supply current to the light-emitting element. The constant-current sources arrange 1st to Nth (N is an integer not smaller than 2) constant-current blocks each including 1st to Mth (M is an integer not smaller than 2) constant-current sources. A current ratio among the 1st to Mth constant-current sources is substantially identical in all of the constant-current blocks. The control circuit selectively brings the 1st to Mth constant-current sources into a valid state based on light-quantity correction data representing valid/invalid states of the 1st to Mth constant-current sources commonly for all of the constant-current blocks, and the control circuit selectively turns on the 1st to Nth constant-current blocks based on gradation data representing on/off states of the 1st to Nth constant-current blocks. A constant-current source, belonging to a turned-on constant-current block and being in a valid state, supplies current to the light-emitting element.

BRIEF DESCRIPTION OF THE DRAWINGS

The accompanying drawings, which are incorporated in and constitute a part of the specification, illustrate an embodiment of the invention and, together with the description, serve to explain the principles of the invention, in which:

FIG. 4 is a table showing a relationship between gradation data and output current values in relation to various light-quantity correction data in accordance with the preferred embodiment of the present invention;

DESCRIPTION OF PREFERRED EMBODIMENT

A preferred embodiment of the present invention will be described with reference to the drawings.

Figure 1:
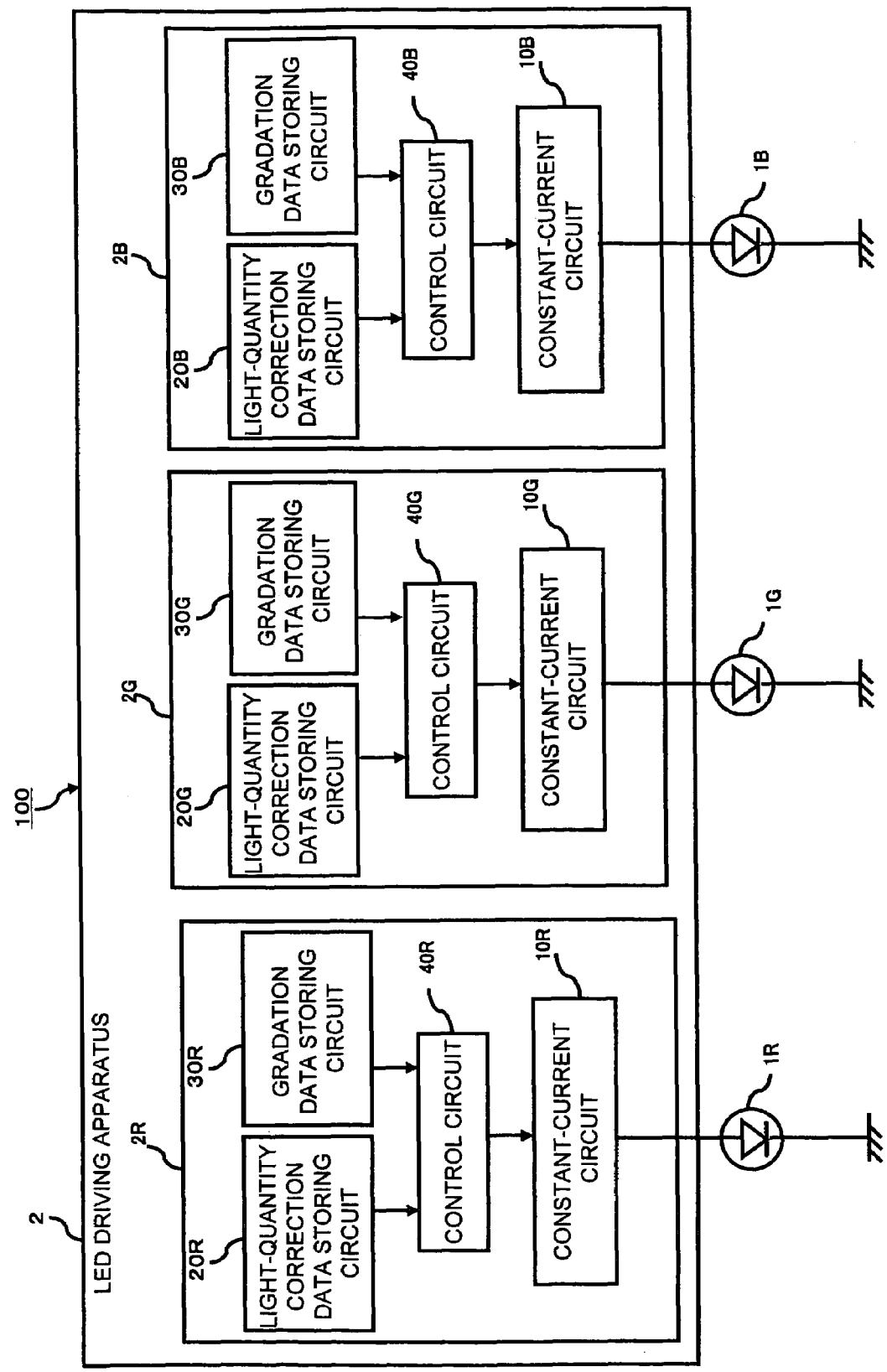
FIG. 1 is a block diagram showing the arrangement of an LED apparatus in accordance with a preferred embodiment of the present invention.

FIG. 1 is a block diagram showing the arrangement of an LED apparatus 100 in accordance with one embodiment of the present invention. The LED apparatus 100 is a light-emitting apparatus including a plurality of LEDs (i.e., light-emitting diodes). The LED apparatus 100 can be, for example, used as an LED television receiver or an outdoor LED display. In this embodiment, the LED apparatus 100 includes a red LED 1R, a green LED 1G, and a blue LED 1B. The LED apparatus 100 generates a desired (or intended) color as a composite output of three colors produced from three LEDs 1R, 1G, and 1B. However, the present invention does not limit the type and color of each light-emitting element to particular ones nor the total number of light-emitting elements.

The LED apparatus 100 includes an LED driving apparatus 2 that drives three LEDs 1R, 1G, and 1B. The LED driving apparatus 2, constructed from a single IC (integrated circuit), includes an LED driving section 2R driving the LED 1R, an LED driving section 2G driving the LED 1G, and an LED driving section 2B driving the LED 1B. Each of the LED driving sections 2R, 2G, and 2B is a circuit that performs both a light quantity correction and a gradation control for the LED by current control. As shown in FIG. 1, the LED driving sections 2R includes a constant-current circuit 10R, a light-quantity correction data storing circuit 20R, a gradation data storing circuit 30R, and a control circuit 40R. The LED driving sections 2G includes a constant-current circuit 10G, a light-quantity correction data storing circuit 20G, a gradation data storing circuit 30G, and a control circuit 40G. The LED driving sections 2B includes a constant-current circuit 10B, a light-quantity correction data storing circuit 20B, a gradation data storing circuit 30B, and a control circuit 40B.

The arrangement of the LED driving apparatus 2R will next be described in detail. As the LED driving apparatuses 2G and 2B are arranged substantially the same as the LED driving apparatus 2R, these components will not be described in detail below.

Figure 2:
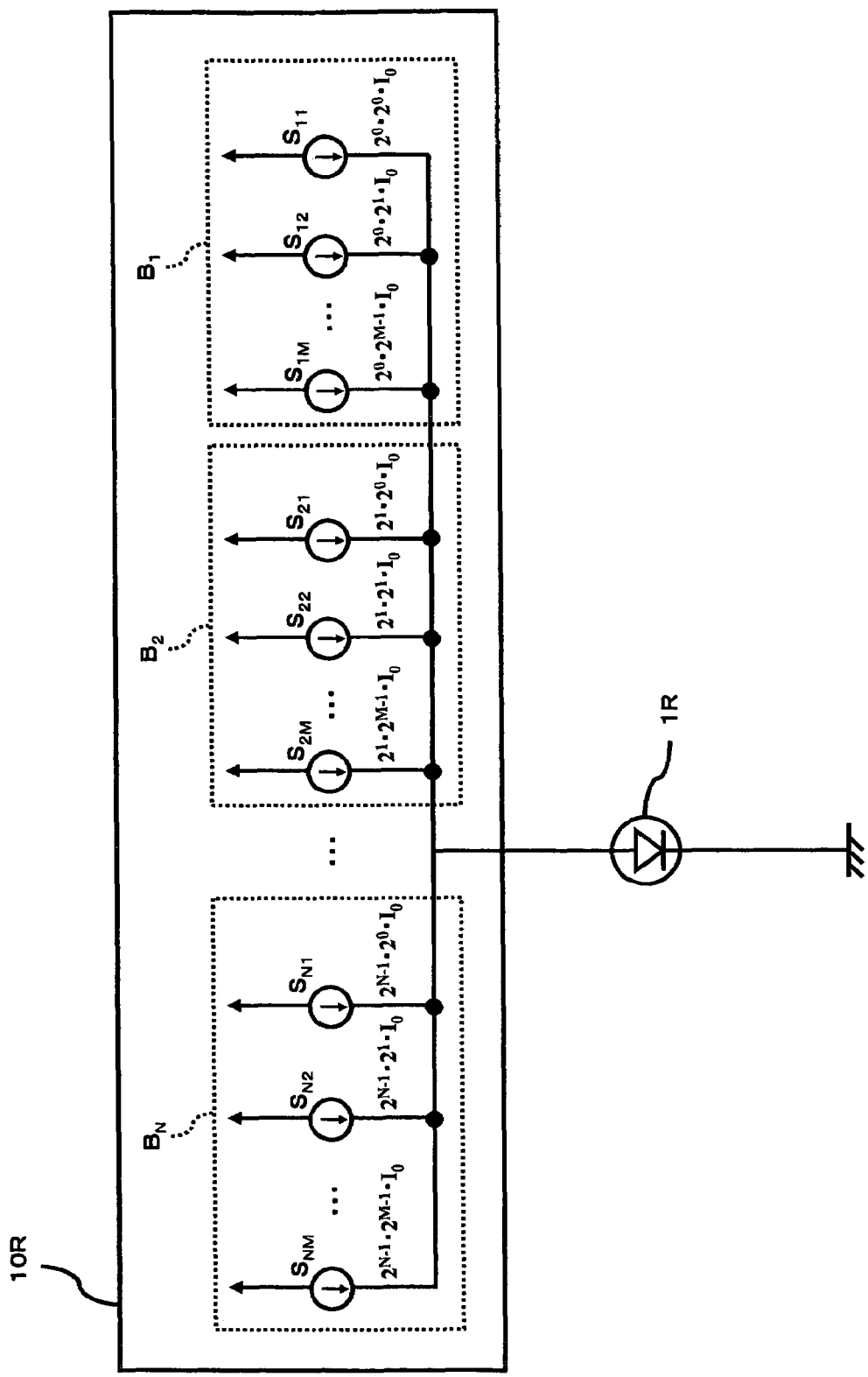
FIG. 2 is a schematic diagram showing the arrangement of a constant-current circuit in accordance with the preferred embodiment of the present invention.

The constant-current circuit 10R includes a plurality of constant-current sources that supply driving current to the LED 1R. FIG. 2 is a schematic diagram showing the arrangement of the constant-current circuit 10R. As shown in FIG. 2, the constant-current circuit 11R includes a plurality of constant-current sources $S_{11}$ to $S_{NM}$ that are connected in parallel with each other. Each of constant-current sources $S_{11}$ to $S_{NM}$ is connected in series to the LED 1R. In a plurality of constant-current sources $S_{11}$ to $S_{NM}$, constant-current sources $S_{11}$ to $S_{1M}$ together constitute a 1st constant-current block $B_1$. Similarly, constant-current sources $S_{21}$ to $S_{2M}$ together constitute a 2nd constant-current block $B_2$ and constant-current sources $S_{N1}$ to $S_{NM}$ cooperatively arrange an Nth constant-current block $B_N$. In general, "$S_{nm}$" represents the mth (m=1, 2, . . . , M) constant-current source belonging to the nth (n=1, 2, . . . , N) constant-current block Bn.

Output current values of the constant-current sources $S_{11}$ to $S_{NM}$ are weighted in the following manner. In each of respective constant-current blocks, a current ratio among 1st, 2nd, . . . , and Mth constant-current sources is set to be $2^0:2^1: \ldots :2^{M-1}$. Furthermore, with respect to each of 1st to Mth constant-current sources, a current ratio among the constant-current blocks $B_1, B_2, \ldots,$ and $B_N$ is set to be $2^0:2^1: \ldots :2^{N-1}$. In other words, in each value of m (m=1 to M), a current ratio among the constant-current sources $S_{1m}$, $S_{2m}, \ldots,$ and $S_{Nm}$ is set to be $2^0:2^1: \ldots :2^{N-1}$. Accordingly, $2^{n-1} \cdot 2^{m-1} \cdot I_0$ ($I_0$ is a unit current value) represents an output current value of mth constant-current source $S_{nm}$ belonging to the constant-current block $B_n$.

The light-quantity correction data storing circuit 20R is a nonvolatile type that stores light-quantity correction data for the LED 1R. For example, the light-quantity correction data storing circuit 20R may be a flash memory or other nonvolatile semiconductor memory. The light-quantity correction data, common to all of the constant-current blocks, represent valid/invalid states of the 1st to Mth constant-current sources. The light-quantity correction data is, for example, bit data of M-bit, each bit showing the valid/invalid state of a constant-current source.

The gradation data storing circuit 30R is a volatile type that stores gradation data for the LED 1R. For example, the gradation data storing circuit 30R can be any one of a RAM (Random Access Memory), a shift register, and a latch circuit. The gradation data represent ON/OFF states of the constant-current blocks $B_1$ to $B_N$. The gradation data is, for example, bit data of N-bit, each bit showing the ON/OFF state of a constant-current block.

The control circuit 40R controls an output current value of the constant-current circuit 11R based on the light-quantity correction data and the gradation data. More specifically, the control circuit 40R selectively brings 1st to Mth constant-current sources of each constant-current block into a valid state or an invalid state based on the light-quantity correction data. The valid state is a state wherein the constant-current source can be turned on, while the invalid state is a state wherein the constant-current source is always turned off. Furthermore, the control circuit 40R selectively turns on or off the constant-current blocks $B_1$ to $B_N$ based on the gradation data. With this arrangement, when a constant-current block is turned on by the control circuit 40R, a constant-current source which is associated with the turned-on constant-current block and which is in a valid state supplies driving current to the LED 1R.

With the above-described arrangement, the light-quantity correction data can be set to any value in the range from "00 - - - 0" (0 as a decimal number) to "11 - - - 1" ($2^M-1$ as a decimal number). The current value producible from each constant-current block $B_n$ (n=1, 2, . . . , N) is adjustable in the range from $2^{n-1} \cdot 0 \cdot I_0$ (=0) to $2^{n-1} \cdot (2^M-1) \cdot I_0$, more specifically, to any one of a total of $2^M$ stages that are divided at equal intervals (i.e., steps of $2^{n-1} \cdot I_0$). For example, when the light-quantity correction data is set to L (as a decimal number), a current value producible from the constant-current block $B_n$ is $2^{n-1} \cdot L \cdot I_0$, i.e., $L/(2^M-1)$ times the maximum output current value. In this condition, the gradation data can be set to any value in the range from "00 - - - 0" (0 as a decimal number) to "11 - - - 1" ($2^N-1$ as a decimal number). The output current value of the constant-current circuit 10R is adjustable in the range from $0 \cdot L \cdot I_0$ (=0) to $2^{N-1} \cdot L \cdot I_0$, more specifically, to any one of a total of $2^N$ stages that are divided at equal intervals (i.e., steps of $L \cdot I_0$). For example, when the gradation data is set to G (as a decimal number), the current value of the constant-current circuit 10R is $G \cdot L \cdot I_0$. Accordingly, the above-described arrangement can realize both light quantity correction and gradation control of an LED based on current value gradation.

In the constant-current circuit 10R, each constant-current block can include a constant-current source which is continuously maintained in the valid state. For example, each constant-current block $B_n$ (n=1, 2, . . . , N) may additionally include a constant-current source whose output current value is $2^{n-1} \cdot \alpha \cdot I_0$ and is always in a valid state. The current value producible from each constant-current block $B_n$ can be set to any value in the range from $2^{n-1} \cdot (0+\alpha) \cdot I_0$ to $2^{n-1} \cdot (2^M-1+\alpha) \cdot I_0$. In other words, the adjustment range for the current value producible from the constant-current block by the light-quantity correction data can have an offset.

Furthermore, the constant-current circuit 10R can include a constant-current block being always in an ON state. For example, the constant-current circuit 10R may additionally include a constant-current block having an output current value of $\beta \cdot L \cdot I_0$ (L is light-quantity correction data) and constantly maintained in an ON state. The output current value of the constant-current circuit 10R can be set to any value in the range from $(0+\beta) \cdot L \cdot I_0$ to $(2^N-1+\beta) \cdot L \cdot I_0$. Namely, the adjustment range for the output current value of the constant-current circuit 10R by the gradation data can have an offset.

Figure 3:
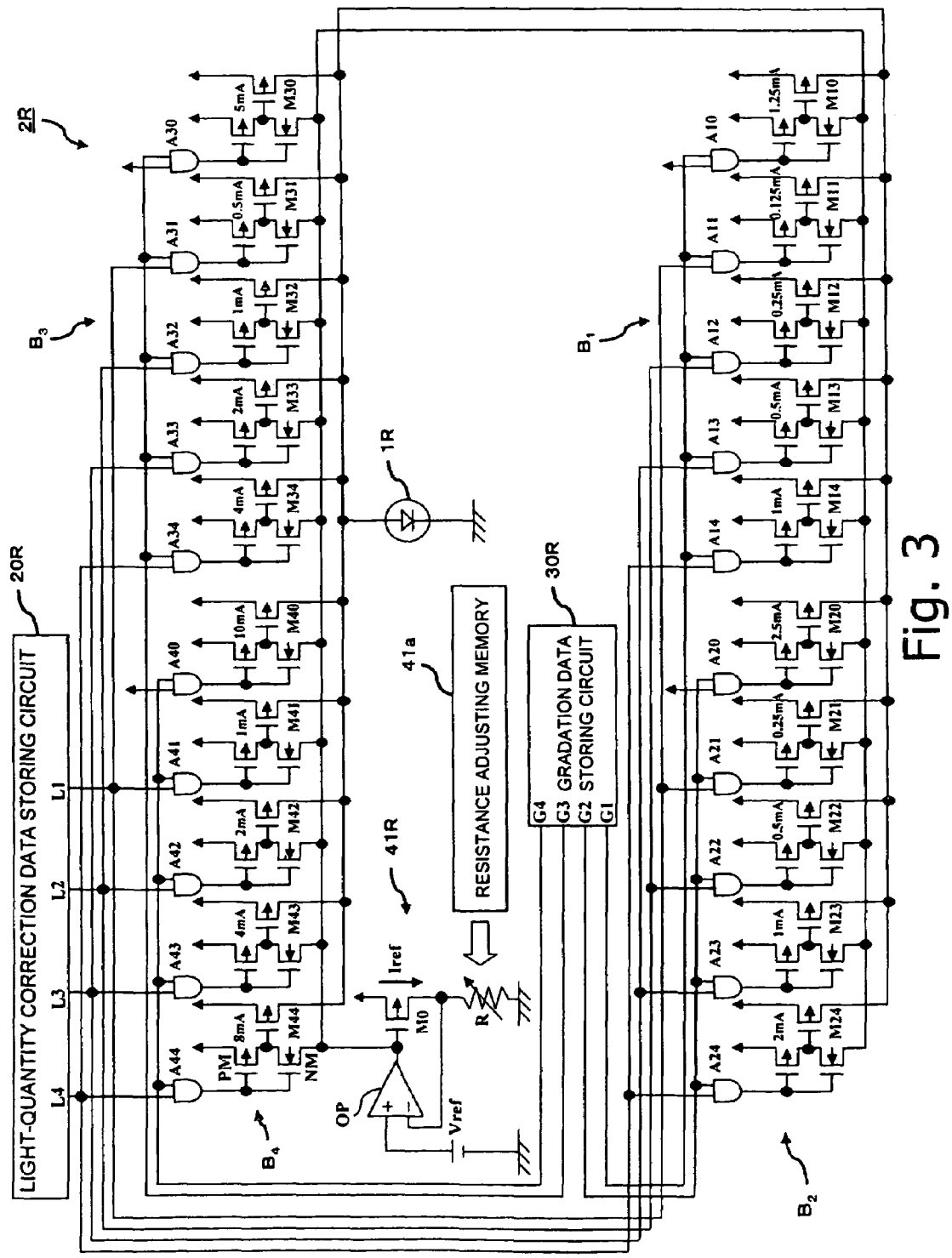
FIG. 3 is a circuit diagram showing details of an LED driving apparatus in accordance with the preferred embodiment of the present invention.

FIG. 3 is a circuit diagram showing a practical arrangement of the LED driving apparatus 2R. The arrangement of the LED driving apparatus 2R will next be described.

The constant-current circuit 10R includes PMOS transistors M10-M14, M20-M24, M30-M34, and M40-M44. Each of the PMOS transistors is an output transistor associated with a reference transistor M0, described below, to form a current-mirror circuit functioning as a constant-current source. With this circuit arrangement, 1st to 4th PMOS transistors M11 to M14 serving as 1st to 4th constant-current sources, and 0th PMOS transistor M10 always in a valid state together comprise the constant-current block $B_1$. Similarly, 1st to 4th PMOS transistors M21 to M24 serving as 1st to 4th constant-current sources and 0th PMOS transistor M20 always in a valid state together constitute the constant-current block $B_2$. 1st to 4th PMOS transistors M31 to M34 (serving as 1st to 4th constant-current sources) and 0th PMOS transistor M30 which is constantly in a valid state together constitute the constant-current block $B_3$. 1st to 4th PMOS transistors M41 to M44 serving as 1st to 4th constant-current sources, and 0th PMOS transistor M40 in a constant valid state together constitute the constant-current block $B_4$. In FIG. 3, "Mnm" represents the mth (m=0 to 4) PMOS transistor belonging to the nth (n=1 to 4) constant-current block.

The sizes of the PMOS transistors M10 to M44 are weighted in the following manner. In each constant-current block, a size ratio among the 0th, 1st, 2nd, 3rd, and 4th PMOS transistors is set to be 10:1:2:4:8. Furthermore, with respect to each of the 0th to 4th PMOS transistors, the size ratio among the constant-current blocks $B_1$, $B_2$, $B_3$, and $B_4$ is set to be 1:2:4:8. In other words, for each value of m (m=0 to 4), a size ratio among the PMOS transistors M1m, M2m, M3m, and M4m is set to 1:2:4:8. Accordingly, $2^{n-1} \cdot 2^{m-1}$ represents the transistor size of the mth (m=1 to 4) PMOS transistor Mnm belonging to the constant-current block $B_n$, when the transistor size of the 1st PMOS transistor M11 belonging to the constant-current block $B_1$ is 1. Furthermore, $2^{n-1} \cdot 10$ represents the size of 0th PMOS transistor Mn0 belonging to the constant-current block $B_n$.

The light-quantity correction data storing circuit 20R holds light-quantity correction data of 4-bit data, each bit showing a valid/invalid state of a PMOS transistor. The 4-bit data consists of L1, L2, L3, and L4 as 1st-, 2nd-, 3rd-, and 4th-bit data that are arrayed, in that order, from the lowest digit. L1, L2, L3, and L4 correspond to the 1st, 2nd, 3rd, and 4th PMOS transistors, respectively. Bit data "1" shows a valid state, while bit data "0" shows an invalid state.

The gradation data storing circuit 30R holds gradation data of 4-bit data, each bit showing an ON/OFF state of a constant-current block. The 4-bit data consists of G1, G2, G3, and G4 as 1st-, 2nd-, 3rd-, and 4th-bit data that are arrayed in this order from the lowest digit. G1, G2, G3, and G4 correspond to the constant-current blocks $B_1$, $B_2$, $B_3$, and $B_4$, respectively. Bit data "1" shows ON, while bit data "0" shows OFF.

For a total of 20 PMOS transistors M10 to M44, the control circuit 40R includes a total of 20 AND circuits A10 to A44, a total of 20 PMOS transistors PM, and a total of 20 NMOS transistors NM. Furthermore, the control circuit 40R includes a single reference current producing circuit 41R. In FIG. 3, "PM" and "NM" are representatively attached to only one pair of the PMOS transistor and the NMOS transistor located at the upper left position. Hence, "PM" and "NM" are not attached to the remaining 19 pairs of the PMOS transistor and the NMOS transistor.

An AND circuit Anm is provided for each of the 1st to 4th PMOS transistors Mnm (n=1 to 4, m=1 to 4). The AND circuit Anm has two input terminals. Data Lm (i.e., m-th bit data from the lowest digit side) of the light-quantity correction data (i.e., 4-bit data) stored in the light-quantity correction data storing circuit 20R is input into one input terminal of the AND circuit Anm. Data Gn (i.e., n-th bit data from the lowest digit data) of the gradation data (i.e., 4-bit data) stored in the gradation data storing circuit 30R is input to the other input terminal of the AND circuit Anm. The AND circuit Anm produces an AND output of input data Lm and Gn.

An AND circuit An0 is provided for 0th PMOS transistor Mn0 (n=1 to 4). The AND circuit An0 has two input terminals. A power source voltage is input to one input terminal of the AND circuit An0. Data Gn (i.e., n-th bit data from the lowest digit data) of the gradation data (i.e., 4-bit data) stored in the gradation data storing circuit 30R is input to the other input terminal of the AND circuit An0. The AND circuit An0 produces an AND output of the power source voltage and the input data Gn.

The PMOS transistor PM and the NMOS transistor NM are provided for each PMOS transistor Mnm (n=1 to 4, m=0 to 4). The PMOS transistor PM and the NMOS transistor NM have a common gate and a common drain and are connected with each other to arrange an inverter. The common gate (i.e., an input side of the inverter) of the PMOS transistor PM and the NMOS transistor NM is connected to the output terminal of the AND circuit Anm. The common drain (i.e., an output side of the inverter) is connected to a gate of the PMOS transistor Mnm. A source of the PMOS transistor PM is connected to the power source. A source of the NMOS transistor NM is connected to a gate of a reference transistor M0.

The reference current producing circuit 41R includes an operational amplifier OP, a reference voltage source Vref, a PMOS transistor serving as the reference transistor M0, a variable resistor R, and a resistance adjusting memory 41a. The operational amplifier OP has a positive-phase input terminal connected to the reference voltage source Vref and an output terminal connected to the gate of the reference transistor M0. The reference transistor M0 has a source connected to the power source voltage terminal, and a drain connected via the variable resistor R to the ground.

The voltage between terminals of the variable resistor R is fed back to a negative-phase input terminal of the operational amplifier OP. Thus, the operational amplifier OP equalizes the potential of the positive-phase input terminal with the potential of the negative-phase input terminal. More specifically, the operational amplifier OP always equalizes the voltage between the terminals of the variable resistor R to the voltage Vref applied to the positive-phase input terminal. Accordingly, reference current Iref flowing across the reference transistor M0 has a value Vref/R (R is a resistance value of the variable resistor R).

The variable resistor R has a resistance value corresponding to resistance adjusting data stored in the resistance adjusting memory 41a. The resistance adjusting memory 41a is, for example, a 4-bit flash memory. When accuracy of the resistance value is reliable, the variable resistor can be replaced with a fixed resistor and the resistance adjusting memory 41a can be omitted.

With setting of the above-described resistance adjusting data, the current Vref/R, i.e., reference current Iref, is equalized to 0.125 mA. The transistor size of the above-described reference transistor M0 is identical with the transistor size of the PMOS transistor M11.

The on/off operations of the PMOS transistors M10 to M44 will next be described.

First, the 1st to 4th PMOS transistors Mnm (n=1 to 4, m=1 to 4) turn on and off in the following manner. As described above, the AND circuit Anm corresponding to the PMOS transistor Mnm produces an AND output of the data Lm and the data Gn. When the light-quantity correction data show an invalid state of mth PMOS transistor Mnm (i.e., Lm=0), the AND circuit Anm produces an output of Low level regardless of the gradation data. Thus, the PMOS transistor PM is turned on while the NMOS transistor NM is turned off. The gate potential of the PMOS transistor Mnm becomes substantially equal to the power source potential. Thus, the PMOS transistor Mnm is in an OFF state. In this manner, as far as the light-quantity correction data show an invalid state of mth PMOS transistor Mnm (i.e., Lm=0), the mth PMOS transistor Mnm is always in OFF state, i.e., in invalid state, in each constant-current block.

When the light-quantity correction data indicate that the mth PMOS transistor Mnm is in a valid state (i.e., Lm=1), the AND circuit Anm produces an output determined by the gradation data. When the gradation data indicate that the constant-current block $B_n$ is in an OFF state (i.e., data Gn=0), the AND circuit Anm produces an output of Low level and the PMOS transistor Mnm is turned off. On the other hand, when the gradation data indicate that the constant-current block $B_n$ is in an ON state (i.e., data Gn=1), the AND circuit Anm produces an output of High level. Thus, the PMOS transistor PM is turned off while the NMOS transistor NM is turned on. As a result, the gate potential of the PMOS transistor Mnm becomes substantially equal to the gate potential of the reference transistor M0. Thus, the PMOS transistor Mnm and the reference transistor M0 are in a current-mirror relationship, and accordingly the PMOS transistor Mnm is turned on. The reference current Iref flowing across the reference transistor M0 is 0.125 mA. As a transistor size ratio between the reference transistor M0 and the PMOS transistor Mnm is $1:2^{n-1} \cdot 2^{m-1}$, the PMOS transistor Mnm produces an output current value of $2^{n-1} \cdot 2^{m-1} \cdot 0.125$ mA. In this manner, when the light-quantity correction data shows a valid state for the mth PMOS transistor Mnm (i.e., Lm=1), the mth PMOS transistor Mnm can be turned on, i.e., in a valid state, in each constant-current block. In this condition, the PMOS transistor Mnm is turned off when the constant-current block $B_n$ is Off state (i.e., data Gn=0). The PMOS transistor Mnm is turned on when the constant-current block $B_n$ is in an ON state (i.e., data Gn=1).

Next, the ON/OFF state of 0th PMOS transistor Mn0 (n=1 to 4) will be described. As described above, the AND circuit An0 corresponding to the PMOS transistor Mn0 does not input the light-quantity correction data and, instead, inputs the power source voltage and the data Gn. Therefore, the AND circuit An0 produces an output determined according to the gradation data, which is not dependent on the light-quantity correction data. When the constant-current block $B_n$ is in an OFF state (i.e., data Gn=0), the PMOS transistor Mn0 is turned off. On the other hand, when the constant-current block $B_n$ is in an ON state (i.e., data Gn=1), the PMOS transistor Mn0 and the reference transistor M0 are in a current-mirror relationship, and accordingly the PMOS transistor Mn0 is turned on. The reference current Iref flowing across the reference transistor M0 is 0.125 mA. As a transistor size ratio between the reference transistor M0 and the PMOS transistor Mn0 is $1:2^{n-1} \cdot 10$, the PMOS transistor Mn0 produces an output current of $2^{n-1} \cdot 10 \cdot 0.125$ mA. As described above, the PMOS transistor Mn0 is always in valid state. The PMOS transistor Mn0 is turned off when the constant-current block $B_n$ is in an OFF state (i.e., Gn=0). The PMOS transistor Mn0 is turned on when the constant-current block $B_n$ is in an ON state (i.e., Gn=1).

FIG. 4 is a table showing a relationship between gradation data and output current values in relation to various light-quantity correction data. An operation of the LED apparatus 100 in accordance with the embodiment will be described with reference to FIG. 4.

In general, LEDs do not have uniform luminous efficiency. Therefore, the amount of light emitted by respective LEDs may differ, even when they are driven by identical driving currents. To correct ununiformity of the light quantity in LEDs, the LED apparatus 100 is subjected to a light quantity correction before shipment. The light quantity correction includes an adjustment of the output current value based on the light-quantity correction data.

For example, in a condition that gradation data "1000" is set in the gradation data storing circuit 30R, the light quantity of the LED 1R is measured by a photo sensor while appropriately changing the light-quantity correction data. Then, based on the measured results, the light-quantity correction data value required for the light quantity of LED 1R to become a predetermined light quantity value is identified. The identified light-quantity correction data is set as a fixed value in the light-quantity correction data storing circuit 20R. In this case, as shown in FIG. 4, the light-quantity correction data can be selected from any value in the range from "0000" to "1111". The output current value can be adjusted to any one of 16 levels in the range from 10 mA to 25 mA in increments of 1 mA. Similarly, the light-quantity correction data for the LEDs 1G and 1B can be identified. The identified light-quantity correction data are set as fixed values in the light-quantity correction data storing circuits 20G and 20B, respectively. According to the embodiment, LEDs 1R, 1G, and 1B reach the predetermined light quantity value when the current value is approximately 12 mA, 16 mA, and 21 mA, respectively. The light-quantity correction data storing circuits 20R, 20G, and 20B store light-quantity correction data "0010", "0110", and "1011", respectively.

The above-described predetermined light quantity values can be appropriately determined so that predetermined luminescent colors can be obtained when the LEDs 1R, 1G, and 1B are driven by the same gradation data. For example, the predetermined light quantity value is set to the same light quantity value for each of RGB colors so that white light can be obtained when the LEDs 1R, 1G, and 1B are driven by the same gradation data.

After the above-described light quantity correction is finished, a gradation control for RGB colors can be performed when the LED apparatus 100 is used. The gradation control can be realized by the change of output current value using the gradation data. More specifically, the gradation control for respective RGB colors can be effected by setting the gradation data for RGB colors in the gradation data storing circuits 30R, 30G, and 30B. In such a case, as shown in FIG. 4, the gradation data can be selected from any value in the range from "0000" to "1111". For example, when the light-quantity correction data for the LED 1R is "0010", the output current value can be set to any level in the range from 0.000 to 22.500 mA in increments of 1.500 mA. As apparent from FIG. 4, regardless of the light-quantity correction data, setting of the output current values is stepwise for respective gradation steps and the output current value for each light-quantity correction data changes at the same intervals. In this manner, the output current values for respective RGB colors can be set to any one of 16 levels. In other words, a total of 4096 (16×16×16) luminescent colors can be obtained.

The above-described embodiment realizes the following advantageous effects.

(1) The LED driving apparatus 2R includes 1st to Nth constant-current blocks $B_1$ to $B_N$ each including 1st to Mth constant-current sources. The LED driving apparatus 2R selectively brings the 1st to Mth constant-current sources into valid state based on light-quantity correction data commonly for all of the constant-current blocks $B_1$ to $B_N$. Furthermore, the LED driving apparatus 2R selectively turns on the constant-current blocks $B_1$ to $B_N$ based on gradation data. A current ratio among the 1st to Mth constant-current sources is identical in all of the constant-current blocks. The valid/invalid pattern of the 1st to Mth constant-current sources is identical in all of the constant-current blocks. Thus, the current ratio among the constant-current blocks is maintained at a predetermined ratio irrespective of the light-quantity correction data. Accordingly, regardless of the value for the light-quantity correction data, when gradation data is set, an output current value corresponding to the gradation data can be obtained as a predetermined ratio of current compared with a case wherein all of the constant-current blocks are turned on. According to the arrangement of the embodiment, the current value producible from each constant-current block can be adjusted based on the light-quantity correction data. Thus, the light quantity correction for the LED 1R can be realized. In addition to the light quantity correction, the output current value can be adjusted to a predetermined level based on the gradation data. Thus, the gradation control for the LED 1R can be realized. Namely, according to the above-described embodiment, the current value gradation selecting a current value from a plurality of levels enables to realize both the light quantity correction and the gradation control for an LED. Thus, without relying on the PWM method, performing the gradation control after accomplishing the light quantity correction is feasible. As a result, EMI or other problems accompanying the PWM method can be eliminated.

(2) With respect to all of the constant-current blocks, the current ratio among 1st, 2nd, . . . , mth constant-current sources is set to $2^0:2^1: \ldots :2^{M-1}$. Accordingly, a greater number of current levels can be set with fewer constant-current sources. Furthermore, a plurality of current levels can be set at equal intervals. In the light quantity correction, the output current value can be linearly adjusted. Furthermore, digital light-quantity correction data can be appropriately converted into analog current values.

(3) In each value of m (m=1 to M), the current ratio among the constant-current sources $S_{1m}, S_{2m}, \ldots,$ and $S_{Nm}$ is set to be $2^0:2^1: \ldots :2^{N-1}$. Accordingly, many more current levels can be set with even fewer constant-current blocks. Furthermore, a plurality of current levels can be set at equal intervals. In the gradation control, the output current value can be linearly adjusted. Furthermore, digital gradation data can be appropriately converted into analog current values.

Figure 5:
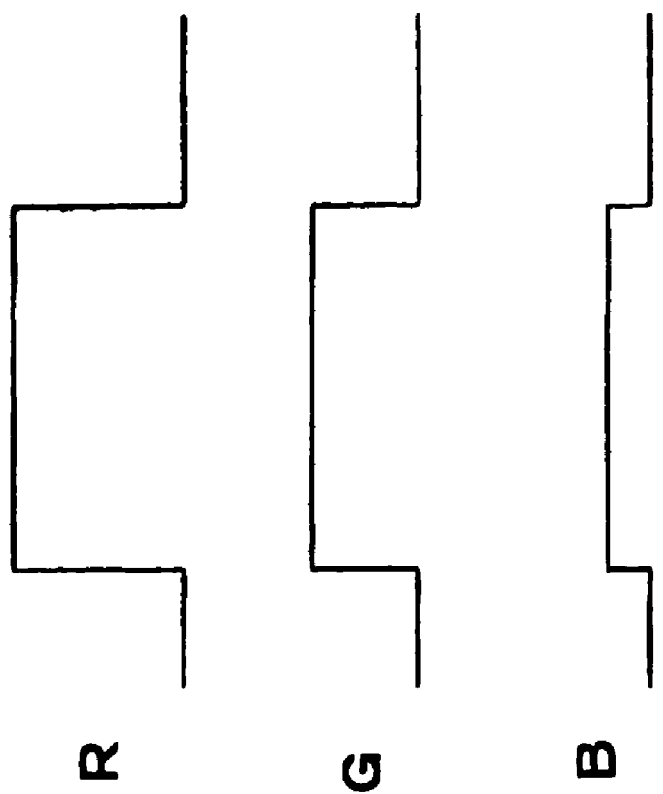
FIG. 5 is a view showing driving currents for RGB colors according to a gradation control of the preferred embodiment of the present invention.

(4) When a desired color is obtained by combining a plurality of LEDs of mutually different luminescent colors, the LED driving apparatus according to the present embodiment can be used for driving each LED. More specifically, the LED driving sections 2R, 2G, and 2B are provided for LEDs 1R, 1G, and 1B, respectively. For all of the LEDs, both the light quantity correction and the gradation control can be carried out based on the current value gradation that changes the current value. Accordingly, as shown in FIG. 5, unlike the PWM method, the gradation can be realized by changing the current value. Thus, mixing of colors can be realized throughout the operational period and reproducibility of colors is superior.

The present invention is not limited to the above-described embodiment, and accordingly can be modified in various ways without departing from the scope and concept of the present invention.

For example, the current ratio among 1st to Mth constant-current sources is not limited to the geometric progression of common ratio 2, and accordingly the current ratio can be determined according to other weighting. In practice, the geometric progression of common ratio r (r=3, 4, . . . ) can be used. The ratio of 1:1:1 or 1:4:10 can be also used.

Furthermore, the current ratio among the constant-current sources $S_{1m}, S_{2m}, \ldots, S_{Nm}$ is not limited to the geometric progression of common ratio 2, and accordingly the current ratio can be determined according to other weighting. In practice, the geometric progression of common ratio r (r=3, 4, . . . ) can be used. The ratio of 1:1:1 or 1:4:10 also can be used.

Furthermore, the output transistors shown in FIG. 3 are not limited to PMOS transistors, and can be replaced with, for example, NMOS transistors, NPN-type bipolar transistors, or PNP-type bipolar transistors. Furthermore, a plurality of light-emitting elements can be of the same luminescent color. For example, the LEDs of RGB colors in the LED apparatus 100 can be replaced with three red LEDs.

Figure 6:
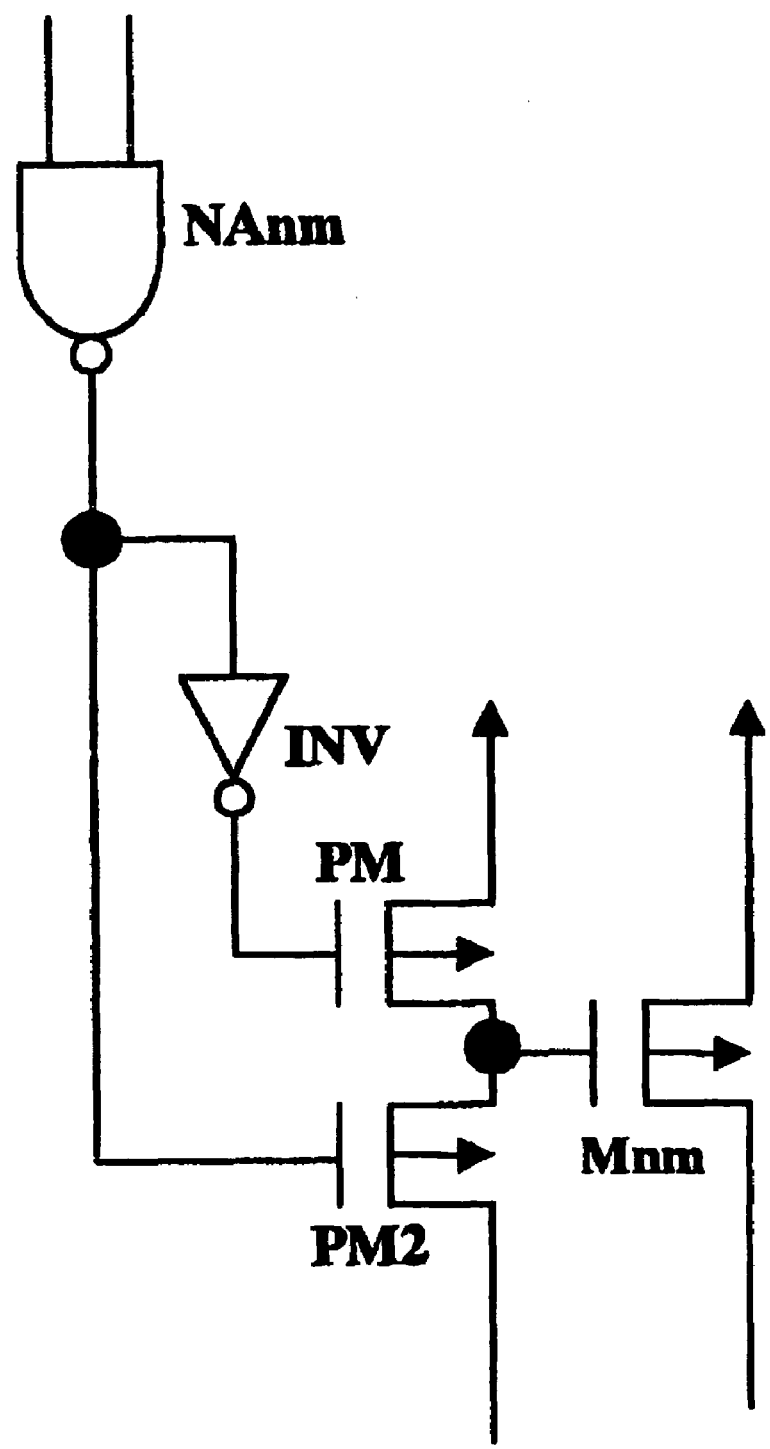
FIG. 6 is a circuit diagram showing a further example control circuit according to the present invention.

Furthermore, the control circuit 40R shown in FIG. 3 can be appropriately modified. For example, FIG. 6 shows a modified example of the control circuit 40R. In FIG. 6, for each of 0th to 4th PMOS transistors Mnm (n=1 to 4, m=0 to 4), the AND circuit Anm is replaced with a NAND circuit NAnm. The NAND circuit NAnm has an output terminal connected via an inverter INV to the gate of the PMOS transistor PM. The NMOS transistor NM is replaced with a PMOS transistor PM2.

Furthermore, the reference current producing circuit 41R shown in FIG. 3 can be shared among the LED driving sections 2R, 2G, and 2B. In this case, the reference transistor M0 provided in the reference current producing circuit 41R is arranged to form a current-mirror circuit with each of the output transistors of the LED driving sections 2R, 2G, and 2B.

Furthermore, the light-quantity correction data are generally fixed. Thus, although the light-quantity correction data storing circuits 20R, 20G, and 20B are generally a nonvolatile type, volatile circuits may be employed.

Figure 7:
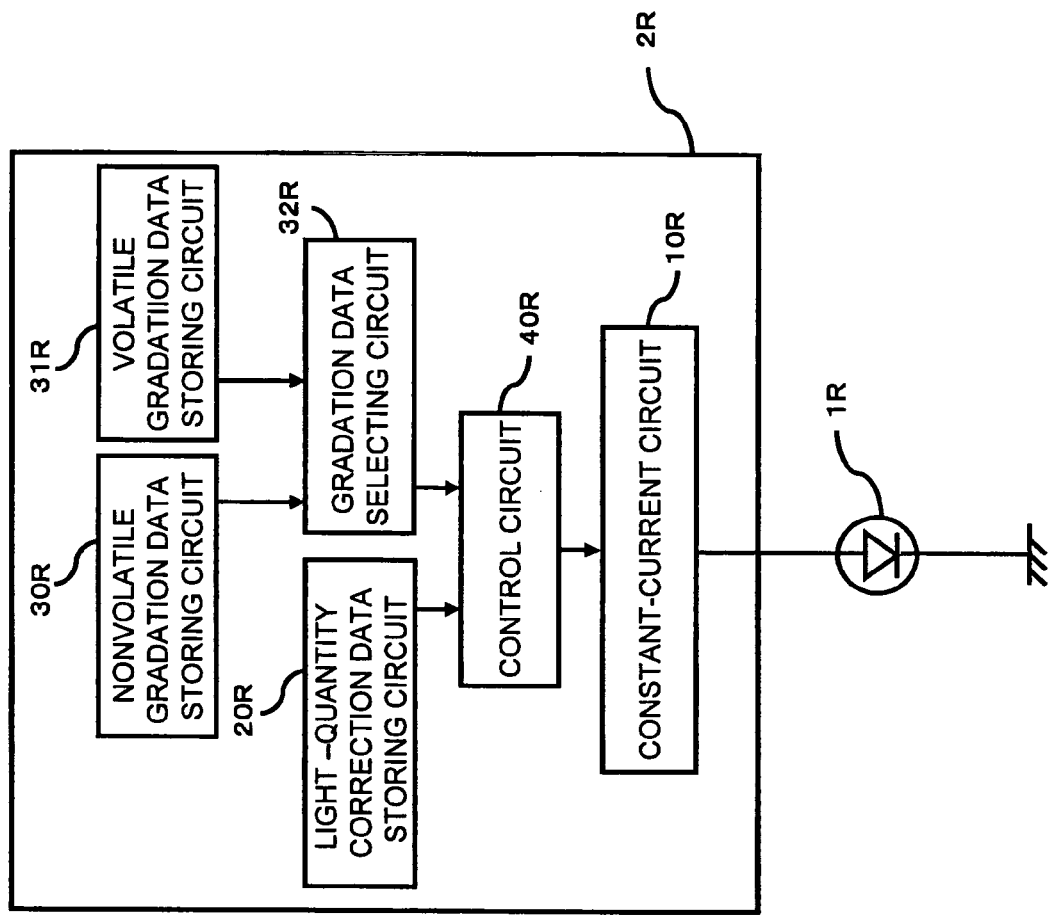
FIG. 7 is a block diagram showing a further example LED driving apparatus according to the present invention.
Figure 8:
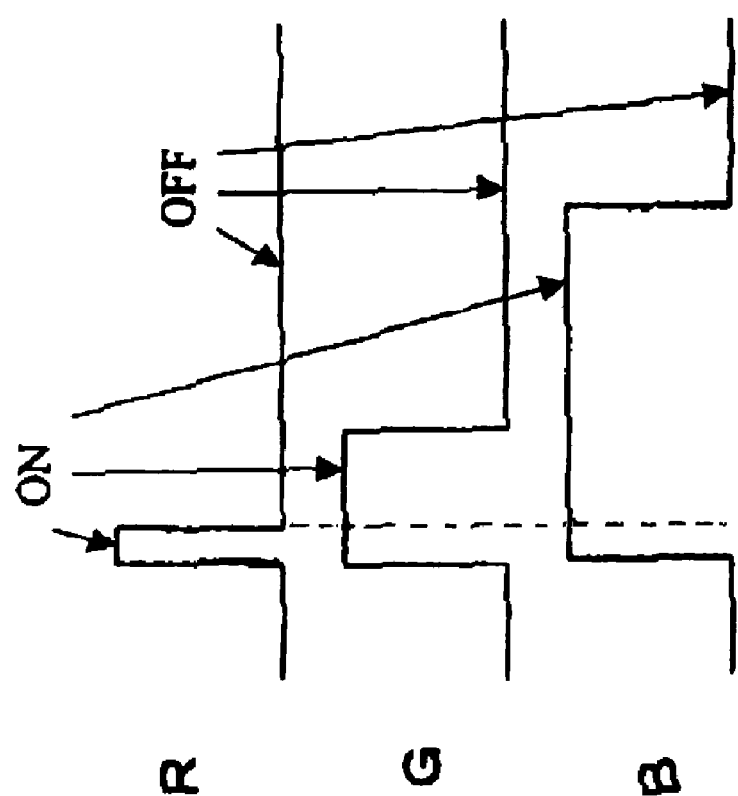
FIG. 8 is a view showing driving currents of RGB colors according to a conventional PWM-type gradation control.

Furthermore, the gradation data can be occasionally and selectively set. Thus, the gradation data storing circuits 30R, 30G, and 30B are generally a volatile type, but can be nonvolatile. Moreover, as shown in FIG. 7, the LED driving apparatus 2R can further include a nonvolatile gradation data storing circuit 31R and a gradation data selecting circuit 32R in addition to the volatile gradation data storing circuit 30R. The nonvolatile gradation data storing circuit 31R stores fixed gradation data beforehand, unlike the above-described volatile gradation data storing circuit 30R that stores variable gradation data. The gradation data selecting circuit 32R selects either the fixed gradation data or the variable gradation data based on an externally given instruction and supplies the selected gradation data to the control circuit 40R.

While the present invention has been described with reference to an exemplary embodiment, it is to be understood that the invention is not limited to the described examples. The scope of the following claims is to be accorded the broadest interpretation so as to encompass all modifications, equivalent structures, and functions.

What is claimed is:

1. A light-emitting element driving apparatus driving a light-emitting element, comprising:

a constant-current circuit including a plurality of constant-current sources that are connected in parallel with each other and are respectively connected in series to a light-emitting element to supply current to the light-emitting element, wherein the plurality of constant-current sources arrange 1st to Nth (N is an integer not smaller than 2) constant-current blocks each including 1st to Mth (M is an integer not smaller than 2) constant-current sources, and a current ratio among the 1st to Mth constant-current sources is substantially identical in all of the constant-current blocks; and a control circuit selectively bringing the 1st to Mth constant-current sources into a valid state based on light-quantity correction data representing valid/invalid states of the 1st to Mth constant-current sources commonly for all of the constant-current blocks, and selectively turning on the 1st to Nth constant-current blocks based on gradation data representing on/off states of the 1st to Nth constant-current blocks,
wherein a constant-current source belonging to a turned-on constant-current block and being in a valid state supplies current to the light-emitting element.

2. The light-emitting element driving apparatus according to claim 1, wherein a current ratio among 1st, 2nd, ..., Mth constant-current sources is set to $2^0:2^1:\ldots:2^{M-1}$ for all the constant-current blocks.

3. The light-emitting element driving apparatus according to claim 1, wherein, when $S_{nm}$ represents the mth (m=1 to M) constant-current source belonging to the nth (n=1 to N) constant-current block, a current ratio among constant-current sources $S_{1m}, S_{2m}, \ldots,$ and $S_{Nm}$ is set to $2^0:2^1:\ldots:2^{N-1}$ for each value of m (m=1 to M).

4. The light-emitting element driving apparatus according to claim 2, wherein, when $S_{Nm}$ represents the mth (m=1 to M) constant-current source belonging to the nth (n=1 to N) constant-current block, a current ratio among constant-current sources $S_{1m}, S_{2m}, \ldots,$ and $S_{Nm}$ is set to $2^0:2^1:\ldots:2^{N-1}$ for each value of m (m=1 to M).

5. The light-emitting element driving apparatus according to claim 1, further comprising a nonvolatile light-quantity correction data storing circuit that stores the light-quantity correction data and supplies the light-quantity correction data to the control circuit.

6. The light-emitting element driving apparatus according to claim 1, further comprising a gradation data storing circuit that stores the gradation data and supplies the gradation data to the control circuit.

7. The light-emitting element driving apparatus according to claim 5, further comprising a gradation data storing circuit that stores the gradation data and supplies the gradation data to the control circuit.

8. The light-emitting element driving apparatus according to claim 1, further comprising
a nonvolatile gradation data storing circuit containing preinstalled fixed gradation data,
a volatile gradation data storing circuit that stores variable gradation data, and
a gradation data selecting circuit that selects either the fixed gradation data or the variable gradation data based on an input instruction and supplies the selected gradation data to the control circuit.

9. The light-emitting element driving apparatus according to claim 5, further comprising
a nonvolatile gradation data storing circuit containing preinstalled fixed gradation data,
a volatile gradation data storing circuit that stores variable gradation data, and
a gradation data selecting circuit that selects either the fixed gradation data or the variable gradation data based on an input instruction and supplies the selected gradation data to the control circuit.

10. A light-emitting element driving apparatus driving a plurality of light-emitting elements of mutually different luminescent colors, comprising a driving apparatus provided for each light-emitting element, the driving apparatus comprising:
a constant-current circuit including a plurality of constant-current sources that are connected in parallel with each other and are respectively connected in series to a light-emitting element to supply current to the light-emitting element, wherein the plurality of constant-current sources arrange 1st to Nth (N is an integer not smaller than 2) constant-current blocks each including 1st to Mth (M is an integer not smaller than 2) constant-current sources, and a current ratio among the 1st to Mth constant-current sources is substantially identical in all of the constant-current blocks; and
a control circuit selectively bringing the 1st to Mth constant-current sources into a valid state based on light-quantity correction data representing valid/invalid states of the 1st to Mth constant-current sources commonly for all of the constant-current blocks, and selectively turning on the 1st to Nth constant-current blocks based on gradation data representing on/off states of the 1st to Nth constant-current blocks,
wherein a constant-current source belonging to a turned on constant-current block and being in a valid state supplies current to the light-emitting element.

* * * * *